United States Patent
Freer

(10) Patent No.: US 12,240,625 B2
(45) Date of Patent: *Mar. 4, 2025

(54) DC BUS VOLTAGE CONTROL

(71) Applicant: PRATT & WHITNEY CANADA CORP., Longueuil (CA)

(72) Inventor: Richard Freer, Saint-Basile-le-Grand (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/110,565

(22) Filed: Feb. 16, 2023

(65) Prior Publication Data

US 2024/0283360 A1 Aug. 22, 2024

Related U.S. Application Data

(63) Continuation of application No. 17/402,474, filed on Aug. 13, 2021, now Pat. No. 11,649,065.

(51) Int. Cl.
*H02M 3/158* (2006.01)
*B64D 27/24* (2006.01)
(Continued)

(52) U.S. Cl.
CPC .............. *B64D 41/00* (2013.01); *B64D 27/24* (2013.01); *H02J 1/00* (2013.01); *H02M 1/0022* (2021.05);
(Continued)

(58) Field of Classification Search
None
See application file for complete search history.

(56) References Cited

U.S. PATENT DOCUMENTS

| 9,776,583 | B2 | 10/2017 | Edwards |
| 2009/0198397 | A1 | 8/2009 | Matsumoto |

(Continued)

FOREIGN PATENT DOCUMENTS

| EP | 3657468 A1 | 5/2020 |
| FR | 3072652 A1 | 4/2019 |

(Continued)

OTHER PUBLICATIONS

European Patent Office, Communication re: extended European search report for European patent application No. 22190385.9, Dec. 12, 2022.

*Primary Examiner* — Jared Fureman
*Assistant Examiner* — Aqeel H Bukhari
(74) *Attorney, Agent, or Firm* — Norton Rose Fulbright Canada LLP

(57) ABSTRACT

In accordance with at least one aspect of this disclosure, there is provided a system for aircraft power. The system includes a DC/DC converter having a DC input and a DC output and a switching circuit connecting the DC input to the DC output operable to vary voltage at the DC output. A control module is operatively connected to the switching circuit for variable control of the DC output. The control module includes machine readable instructions to cause the control module to receive input indicative of altitude and control the switching circuit to vary voltage of the DC output as a function of environmental conditions such as altitude and humidity. In embodiments the altitude sensor is operatively connected to the controller.

20 Claims, 3 Drawing Sheets

(51) Int. Cl.
  *B64D 41/00*   (2006.01)
  *H02J 1/00*    (2006.01)
  *H02M 1/00*    (2007.01)
  *H02M 1/32*    (2007.01)
(52) U.S. Cl.
  CPC ........... *H02M 1/007* (2021.05); *H02M 1/327* (2021.05); *H02M 3/158* (2013.01); *B64D 2221/00* (2013.01)

(56) References Cited

U.S. PATENT DOCUMENTS

| | | | |
|---|---|---|---|
| 2016/0023751 A1* | 1/2016 | Lee | G05D 1/102 |
| | | | 244/17.11 |
| 2016/0211767 A1* | 7/2016 | Hotta | H02P 29/032 |
| 2016/0236790 A1 | 8/2016 | Knapp | |
| 2020/0290742 A1 | 9/2020 | Kumar | |
| 2020/0341492 A1 | 10/2020 | Thomassey | |
| 2021/0371116 A1 | 12/2021 | Cartwright | |

FOREIGN PATENT DOCUMENTS

| | | |
|---|---|---|
| JP | 2010252572 A | 11/2010 |
| JP | 2015065742 A | 4/2015 |
| WO | 2018175349 A1 | 9/2018 |

\* cited by examiner

DC BUS VOLTAGE CONTROL

CROSS REFERENCE TO RELATED APPLICATION

This application is a continuation of U.S. patent application Ser. No. 17/402,474 filed on Aug. 13, 2021 and incorporated herein by reference.

TECHNICAL FIELD

The present disclosure relates to voltage control in aircraft.

BACKGROUND

There is always a need in the aerospace industry for improvements to power management.

SUMMARY

In accordance with at least one aspect of this disclosure, there is provided a system for aircraft power. The system includes a DC/DC converter having a DC input and a DC output, and a switching circuit connecting the DC input to the DC output, the switching circuit operable to vary voltage at the DC output. A control module is operatively connected to the switching circuit for variable control of the DC output, and configured to receive input indicative of altitude to control the switching circuit to vary voltage of the DC output as a function of altitude. In embodiments the altitude sensor is operatively connected to the controller.

In embodiments, the DC input is electrically connected to a source of power via an input electrical conductor having a first dielectric insulation disposed thereabout, and the DC output is electrically connected to a power bus via an output electrical conductor having a second dielectric insulation disposed thereabout. In embodiments, the first dielectric insulation is rated for a combination of voltages at a range of altitudes or at a first voltage level at the service altitude ceiling of the aircraft, and the second dielectric insulation is rated for a different, lower voltage level at the same range of altitudes or at a second voltage level at the service ceiling altitude of the aircraft.

In embodiments, an electric energy storage module is electrically connected to the DC input of the DC/DC converter via the input electrical conductor. In embodiments, an electric energy module is electrically connected to the DC input of a DC/DC converter circuit via the first electrical conductor.

In embodiments, an electric energy module is electrically connected to a controllable AC/DC converter via the first electrical conductor. In certain embodiments, an electric generation module is connected to a rectifier and the generation module has a means to vary the power by means of a generator controller that adjusts the excitation of the electric field in the generator, or by means of controlling generator rotating speed, or by a combination of the two, such that the DC output voltage can be varied in response to commands from the system control unit. In embodiments, any combination of these different power sources may be combined onto one or more DC buses.

In embodiments, a plurality of aircraft systems are connected to the DC bus, each being rated for the voltage of the second dielectric at the aircraft service ceiling and each being connected to the DC bus via a respective aircraft system electrical conductor having a respective aircraft system dielectric insulation disposed thereabout. In certain embodiments, the second dielectric insulation and respective aircraft systems dielectric insulation are rated for voltage levels that are higher at sea level than the voltage levels at altitude.

In embodiments, the aircraft system electrical conductors and the output electrical conductors are rated for the lowest possible pressure altitude, during takeoff. In certain embodiments, the first dielectric insulation is rated for arc protection at specific voltage levels between and including: a cruising altitude and the service ceiling altitude of the aircraft. In certain embodiments, the second dielectric insulation and respective aircraft systems dielectric insulations are rated for arc protection for a first operating voltage at ground level, a second operating voltage at a lowest pressure altitude, and rated for altitudes in between the lowest permitted altitude and the highest permitted altitude as a smooth function of altitude and/or as a step change function of altitude.

In embodiments, controlling the switching circuit to vary voltage of the DC output as a function of altitude includes decreasing a DC output voltage as altitude increases. In certain embodiments, decreasing the DC output voltage as altitude increases further includes adjusting a switching duty cycle of the switching circuit to maintain power output from the DC output as altitude increases and voltage decreases. In certain embodiments, the control module automatically controls switching of the switching circuit without user input.

In accordance with another aspect of this disclosure there is provided a system for controlling aircraft power in an electric aircraft. The system includes a switching module connecting between a DC input and a DC output and a control module operatively connected to the switching module, wherein the control module includes means for controlling the switching circuit to vary voltage of the DC output as a function of altitude.

In embodiments, the DC input is a first DC input and the system includes an altitude sensor operatively connected to the control module, an electric energy storage module electrically connected to the first DC input, an electric energy module having a DC voltage output that can be controlled, electrically connected to a second DC input connected to the switching circuit, a power bus electrically connected to the DC output, and a plurality of aircraft systems electrically connected to the power bus. In certain embodiments, at least one aircraft system of the plurality of aircraft systems is an electrical power system for propulsion.

In accordance with yet another aspect of the present disclosure, there is provided a method of controlling voltage in an aircraft power system. The method includes receiving from an altitude sensor input indicative of altitude, and controlling a switching circuit of a converter to vary voltage of a DC output as a function of altitude. In embodiments, the method also includes decreasing a DC output voltage as altitude increases, and in certain embodiments adjusting a switching duty cycle of the switching circuit to maintain power output from the DC output as altitude increases and voltage decreases. The control module and/or the switching circuit can include a current limiting function to avoid damage caused by excessive current to occur in conductors, switching circuit components, or equipment connected to the DC output.

In embodiments, the method further includes maintaining a DC input voltage to the converter as altitude increases. In certain embodiments, the method includes automatically controlling the switching circuit without user input as altitude increases. In some embodiments, the control module can include a secondary dielectric rated for a voltage at altitude and can inform electric power consuming systems attached to the DC bus that higher power consumption is permitted at lower altitudes where higher voltages can be permitted, based on either smooth or discrete step functions based on altitude.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
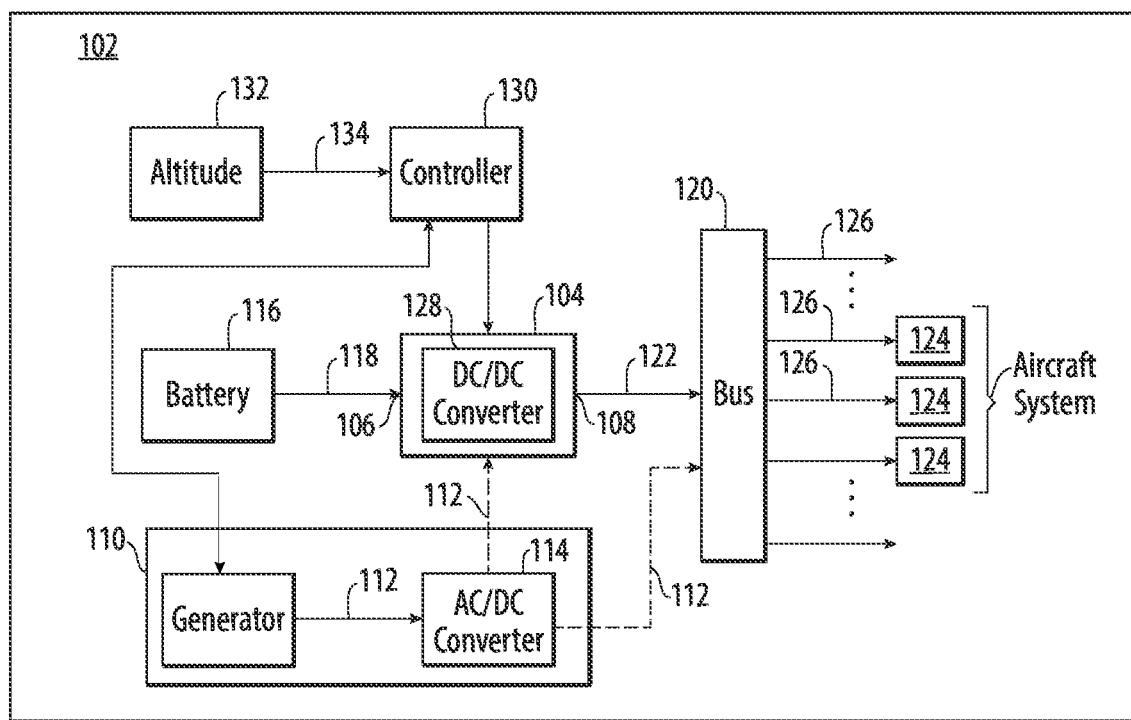
FIG. 1 is a schematic plan view of an embodiment of a system constructed in accordance with this disclosure, showing a system for managing power in an aircraft.
Figure 2:
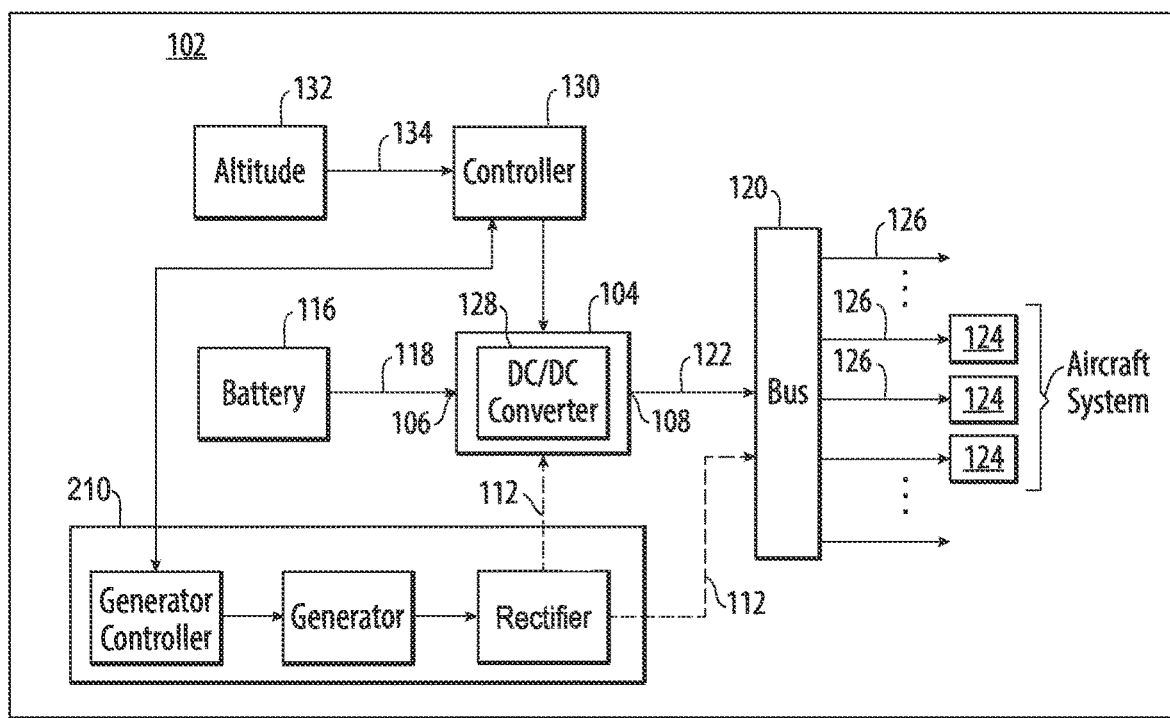
FIG. 2 is a schematic plan view of another embodiment of a system constructed in accordance with this disclosure, showing another system for managing power in an aircraft.
Figure 3:
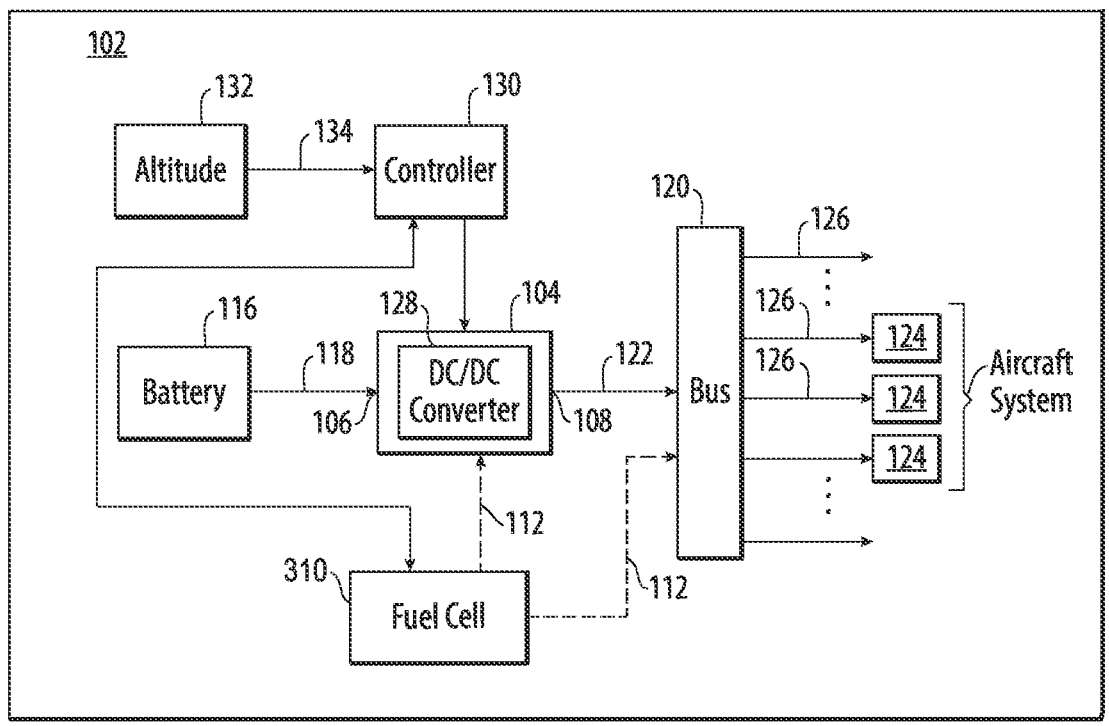
FIG. 3 is a schematic plan view of another embodiment of a system constructed in accordance with this disclosure, showing another system for managing power in an aircraft.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-3.

Certain embodiments described herein can be used to reduce weight of dielectric insulation material in aircraft. Certain embodiments can be used to permit increased voltage while respecting current limits and hence increase permitted power at low altitudes. In other embodiments, a controller can be used reduce the maximum permitted voltage in the event that partial discharge or a degradation of the dielectric somewhere in the system is detected or suspected, thereby maintaining protection against arc or partial discharge while informing the aircraft management systems and power consuming devices of the new limits in terms of maximum power available.

Aircraft electrical systems can be protected from electrical arcing using dielectric materials to insulate wires and other components from each other. The relevant physical properties of air are such that electrical arcing occurs over greater distances and/or at lower voltages at higher altitudes. Typically, the electrical insulation and air gap distances needed for wires and other components must be rated for an aircraft's maximum service altitude, so there is a greater amount of electrical insulation than would be needed for ground-based equipment of similar voltage. The traditional systems have been considered adequate for their intended purposes. However, there is an ongoing need in the art for improved electrical systems for aircraft.

In accordance with at least one aspect of this disclosure there is provided a system 100 for controlling aircraft power in an electric aircraft 102. The electric aircraft 102 can be an all electric aircraft, a hybrid-electric aircraft, a more-electric, a turbo-electric aircraft, or a fuel cell powered aircraft. In certain embodiments, it is contemplated the aircraft is a liquid or gas powered aircraft. The system 100 includes a controllable DC/DC converter 104 having a DC input 106 and a DC output 108.

An electric energy module 110, can be electrically connected to the DC input 106 via a first input electrical conductor 112. In certain embodiments, such as shown in FIG. 1, the electric energy module 110 can be or include at least a generator and a controllable AC/DC converter 114 between the generator and the controllable DC/DC converter 104 for controlling a fixed DC output of the generator. In certain embodiments, the generator can be controlled to have a variable output such that the AC/DC converter 114 can be connected directly to the bus 120 (e.g. as indicated by the hashed lines in FIG. 1).

An electric energy storage module 116 (e.g. a battery) can be electrically connected to the DC input 106 via a second input electrical conductor 118. Any suitable number of generators and/or batteries 116 is contemplated herein (e.g. one or more), however it is also possible the system 100 may include no batteries 116, or alternatively no generators.

The DC output 108 is electrically connected to a power bus 120 via an output electrical conductor 122, and a plurality of aircraft systems 124 are electrically connected to the power bus 120 via a respective aircraft system electrical conductors 126. In certain embodiments, at least one aircraft system of the plurality of aircraft systems 124 is an electrical power system for propulsion (e.g. an electric motor), and at least some of the aircraft systems 124 are not for propulsion.

Each electrical conductor 112, 118, 122, 126 includes a respective dielectric insulation circumferentially thereabout. As used herein, "dielectric" means any element that prevents undesired conduction of electrical power between different conductors. For example, such an element can be or include, solid insulation, dielectric liquid, dielectric gases or air. Where it is stated that the components are rated for the voltage at the aircraft service ceiling, safety margins on voltage and altitude are included even though not explicitly stated.

The first input electrical conductor 112 has a first dielectric insulation with a first voltage rating, and the second input electrical conductor 118 has a dielectric insulation with a voltage rating that may be the same or different than the first voltage rating. As used herein, "voltage rating" means a combination of maximum permitted voltage and altitude, where there are multiple voltage ratings, as a function of altitude. In embodiments, the first dielectric insulation is rated for arc protection for a combination of voltages at a range of altitudes or voltage at the service altitude ceiling of the aircraft 102.

The output conductor 122, including the respective conductors 126 for the plurality of aircraft systems 124, have a second dielectric insulation circumferentially thereabout with a second voltage rating. The second dielectric insulation is rated for a different, lower voltage level than the first dielectric insulation at the same range of altitudes or at the service ceiling altitude of the aircraft. For example, the second dielectric insulation and respective aircraft systems dielectric insulation can be rated for voltage levels that are higher at sea level than the voltage levels at altitude. The second operating voltage can include a voltage range at an aircraft maximum permitted pressure altitude, and can be rated for altitudes in between ground level and maximum permitted pressure altitude as a smooth function of altitude. In certain embodiments, it may also be useful to adjust the operating voltage to obtain better overall system efficiency, within the limits allowed by the maximum voltage permitted at an altitude.

The insulation on both the input and output of the DC/DC converter, e.g. all of conductors 112, 118, 122, 126, are rated for arc protection and partial discharge resistance at the same altitude because they both experience the same altitude. However, the first dielectric insulation is rated for arc protection and partial discharge resistance, and the gaps between bare metal connections are sized for a higher voltage at the service ceiling altitude whereas the second dielectric insulation and gaps between bare metal conductors are rated for a lower voltage at the service ceiling altitude.

In certain embodiments, DC bus 120 and the electrical systems 124 connected thereto via electrical connections 126 are rated for highest voltage at the minimum permitted pressure altitude (e.g. minus 2,000 ft), which can enable higher power to be transmitted within the current limits of the system.

The converter 104,114 includes a switching module 128 (e.g. any suitable switching circuit) connecting between the DC input 106 and the DC output 108 and a control module 130 operatively connected to the switching module 128. The control module 130 includes means for controlling the switching module 128 to vary voltage of the DC output as a function of altitude. The control module 130 and/or the switching module 128 can include a current limiting function to avoid damage caused by excessive current to occur in conductors, switching circuit components or equipment connected to the DC output.

An altitude sensor 132 is operatively connected to the control module 130, and the control module 130 is configured to receive input 134 indicative of altitude and control the switching module 128 to vary voltage of the DC output 108 as a function of altitude (e.g. a smooth function, or discrete, stepwise function). The control module can be or include both hard wired circuits that cause a logic to be executed, and/or software-based components, for example, simple electric circuits employing analogue pressure sensors, or can include a CPU, a memory, machine readable instructions in the memory that when executed cause the CPU to perform a method. In certain embodiments, the control module 130 automatically controls switching of the switching module 128 without user input.

In embodiments, controlling the switching module 128 varies the voltage of the DC output 108 as a function of altitude by decreasing a DC output voltage as altitude increases. For example, decreasing the DC output voltage as altitude increases can include adjusting a switching duty cycle of the switching module 128 to maintain power output from the DC output 108 as altitude increases and voltage decreases. Because the DC output voltage is lowered as altitude increases, the dielectric insulation on the output electrical 122 and the aircraft electrical system conductors 126 need only be rated for the lower output voltages from the DC/DC converter 128 at cruising altitude or at the aircraft's service ceiling, thereby reducing weight of the aircraft electrical systems 124.

In some embodiments, the control module 130 can include a secondary dielectric rated for a voltage at altitude and can inform electric power consuming systems attached to the DC bus 120 that higher power consumption is permitted at lower altitudes where higher voltages can be permitted, based on either smooth or discrete step functions based on altitude.

In traditional systems, all of the electrical insulation has to be rated for the aircraft's full or highest voltage even at cruising altitude or at the service ceiling. The DC/DC converter 128 considerably reduces the amount of electrical insulation needed on an aircraft by lowering the output voltage as the aircraft's altitude increases.

Also contemplated herein are variations of embodiments disclosed to achieve a variable voltage on the bus 120. For example, in certain embodiments, the AC/DC converter can vary the voltage output to the bus 120 without passing through DC/DC converter 104, for example as indicated by the hashed lines in FIG. 1, where the electric energy module 110 can be connected to the bus 120 directly when the controller 130 is connected to both the DC/DC convertor 104 and the AC/DC converter 114. In such embodiments, both the controllable converters 104 and 114 are configured to both try to maintain the same voltage target and/or to the limit coming from the controller 130.

In certain embodiments, a system 200 can have similar components as in system 100. For brevity, the description of common elements that have been described above are not repeated with respect to FIG. 2. In system 200, as shown in FIG. 2, the electric energy module 110 can include a generator, a generator controller and a rectifier, where the electric energy module 110 includes means to vary the power of the generator (e.g. by adjusting the excitation of the electric field in the generator, or by means of controlling generator rotating speed, or by a combination of the two) such that the DC output voltage can be varied in response to commands from a system control unit (e.g. controller 130). In certain embodiments, a variable DC/DC converter may be added to control the voltage of the bus 120 itself.

In certain embodiments, the system 200 the electric energy module 110 can include a filter, where the controller 130 controls the speed of the generator shaft to modify the voltage of the bus 120. Such embodiments may be optimized for running in a narrow speed range, and suitable for intermittent combustion engines (e.g. diesels, gasoline piston engines, rotary engines, constant volume combustion engines, or the like that have a wider operating speed range). In system 200, the electric energy module 110 can be connected to the bus 120 either by connection via the DC/DC converter 104, or by direct connection to the bus 120, as indicated by the hashed lines 112 in FIG. 2.

In certain embodiments, a system 300 can have similar components as in system 200. For brevity, the description of common elements that have been described above are not repeated with respect to FIG. 3. In system 300, as shown in FIG. 3, the electric energy module 110 can be or include a fuel cell. It is possible that any number of fuel cell systems and variable DC/DC convertors to produce electrical power. In system 300, the fuel cell can be connected to the bus 120 either by connection via the DC/DC converter 104, or by direct connection to the bus 120, as indicated by the hashed lines 112 in FIG. 3.

In other embodiments, the system can include wound field generator and a generator controller configured to control the excitation of the generator magnetic field which can be used with a rectifier and suitable filter to provide a DC voltage that is controllable.

In addition to or in lieu of the second dielectric insulation being rated for the lower voltage at the aircraft's service ceiling than in systems with constant output DC/DC converters, the gap spacing for charged electrically conductive components in the aircraft system can be reduced relative to aircraft with constant output DC/DC converters while still maintaining the same level of arc protection as in aircraft with constant output DC/DC converters. Any of systems 100-300 can include any combination of the different power sources described herein, and each of systems 100-300 may be combined onto one or more DC buses as needed or desired for a given application.

The systems and methods provided herein therefore allow for the management and control of the bus voltage as a function of the environmental and ageing effects, which affect a wiring system's ability to avoid arcing (e.g. primarily altitude, but also humidity, insulation age, temperature, etc.). Embodiments also provide for accommodating changes to the system or its mode of operation that might otherwise lead to voltage spikes or increased voltage levels. Embodiments can reduce insulation thickness/weight and gaps between conductors throughout the DC electrical system, e.g. in cables, junctions, distribution systems, protection systems, electric motors and generators.

In accordance with yet another aspect of the present disclosure, there is provided a method of controlling voltage in an aircraft power system (e.g. system 100). In embodiments, the method includes receiving from the altitude sensor 132 input 134 indicative of altitude, and automatically controlling a switching circuit (e.g. switching module 128) of the DC/DC converter 104 to vary voltage of the DC output 108 as a function of altitude. In embodiments, the method includes decreasing a DC output voltage as altitude increases, and increasing a switching duty cycle of the switching module 128 to increase current output in the DC output 108. In certain embodiments, the method further includes maintaining the DC input voltage to the DC/DC converter 104 as altitude increases.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

For example, the following particular embodiments of the present technology are likewise contemplated, as described herein next by clauses.

Clause 1. A system (100) for aircraft power, comprising:
a DC/DC converter (104) including,
a DC input (106) and a DC output (108);
a switching circuit (128) connecting the DC input to the DC output operable to vary voltage at the DC output; and a control module (130) operatively connected to the switching circuit for variable control of the DC output configured to:
receive input indicative of altitude; and
control the switching circuit to vary voltage of the DC output as a function of altitude.

Clause 2. The system as recited in clause 1, further comprising the altitude sensor (132) operatively connected to the controller.

Clause 3. The system as recited in clause 1, wherein the DC input is electrically connected to a source of power (110) via an input electrical conductor (112) having a first dielectric insulation disposed circumferentially around the input electrical conductor, and wherein the DC output is electrically connected to a power bus (120) via an output electrical conductor (122) having a second dielectric insulation disposed circumferentially around the output electrical conductor, wherein the first dielectric insulation is rated for a combination of voltages at a range of altitudes or at a first voltage level at the service altitude ceiling of the aircraft, and wherein the second dielectric insulation is rated for a different, lower voltage level at the same range of altitudes or at a second voltage level at the service ceiling altitude of an aircraft.

Clause 4. The system as recited in clause 3, further comprising an electric energy storage module (116) electrically connected to the DC input of the DC/DC converter via the input electrical conductor.

Clause 5. The system as recited in clause 3, further comprising an electric energy module (110,116) electrically connected to the DC input of the DC/DC converter via an the first electrical conductor.

Clause 6. The system as recited in clause 3, wherein the first dielectric insulation is rated for arc protection at specific voltage levels at altitudes between and including: a cruising altitude and the service ceiling altitude of an aircraft.

Clause 7. The system as recited in clause 3, further comprising a plurality of aircraft systems (124) connected to the DC bus, each via a respective aircraft system electrical conductor (126) having a respective aircraft system dielectric insulation disposed circumferentially thereabout.

Clause 8. The system as recited in clause 7, wherein the second dielectric insulation and respective aircraft systems dielectric insulations are rated for arc protection at a lower voltage level at range of altitudes between and including: a cruising altitude and the service ceiling altitude of an aircraft.

Clause 9. The system as recited in clause 7, wherein the aircraft system electrical conductors and the output electrical conductors are rated for highest voltage at lowest pressure altitude.

Clause 10. The system as recited in clause 9, wherein the second dielectric insulation and respective aircraft systems dielectric insulations are rated for arc protection for a first operating voltage at ground level, a second operating voltage at a lowest pressure altitude, and rated for altitudes in between ground level and lowest permitted altitude as a smooth function of altitude.

Clause 11. The system as recited in clause 9, wherein the second dielectric insulation and respective aircraft systems dielectric insulations are rated for arc protection for a first operating voltage at ground level, a second operating voltage at a lowest pressure altitude, and rated for altitudes in between ground level and lowest permitted altitude as a step change function of altitude.

Clause 12. The system as recited in clause 1, wherein controlling the switching circuit to vary voltage of the DC output as a function of altitude further includes decreasing a DC output voltage as altitude increases.

Clause 13. The system as recited in clause 1, wherein the control module automatically controls switching of the switching circuit without user input.

Clause 14. A system for controlling aircraft power in an electric aircraft, comprising:
a switching module (128) connecting between a DC input (106) and a DC output (108); and
a control module (130) operatively connected to the switching module, wherein the control module includes means for controlling the switching circuit to vary voltage of the DC output as a function of altitude.

Clause 15. The system as recited in clause 14, wherein the DC input is a first DC input and further comprising:
an altitude sensor (132) operatively connected to the control module;
an electric energy storage module (116) electrically connected to the first DC input;
an electric energy module (110) electrically connected to a second DC input connected to the switching circuit;
a power bus (120) electrically connected to the DC output; and
a plurality of aircraft systems (124) electrically connected to the power bus.

Clause 16. The system as recited in clause 15, wherein at least one aircraft system of the plurality of aircraft systems is an electrical power system for propulsion.

Clause 17. A method of controlling voltage in an aircraft power system, comprising:
receiving from an altitude sensor (132) input indicative of altitude; and
controlling a switching circuit (128) of a converter (104) to vary voltage of a DC output (108) as a function of altitude.

Clause 18. The method as recited in clause 17, further comprising:
decreasing a DC output voltage as altitude increases.

Clause 19. The method as recited in clause 18, further comprising:
maintaining a DC input voltage to the converter as altitude increases.

Clause 20. The method as recited in clause 19, further comprising:
automatically controlling the switching circuit without user input as altitude increases.

What is claimed is:

1. A system for controlling aircraft power in an aircraft, the system comprising:
a DC/DC electrical power converter configured to be connected to an aircraft system via a conductor having a dielectric insulation disposed therearound, the dielectric insulation rated for an altitude less than a maximum service altitude of the aircraft, the converter including:
a DC input and a DC output; and
a switching circuit connecting the DC input to the DC output and operable to vary a voltage at the DC output; and
a control module operatively connected to the switching circuit for variable control of the voltage at the DC output, the control module being operative to:
receive input indicative of an altitude of the aircraft; and
cause the switching circuit to set the voltage of the DC output to at most a maximum voltage value, the maximum voltage value determined as a function of the altitude of the aircraft and corresponding to a voltage value above which a risk of electrical arcing via the conductor and through the dielectric insulation is increased for the altitude.

2. The system as recited in claim 1, further comprising an altitude sensor operatively connected to the controller.

3. The system as recited in claim 1, wherein:
the DC input is electrically connected to a source of power via an input electrical conductor having a first dielectric insulation disposed circumferentially around the input electrical conductor;
the DC output is electrically connected to a power bus via an output electrical conductor having a second dielectric insulation disposed circumferentially around the output electrical conductor;
the first dielectric insulation is rated for a combination of voltages at a range of altitudes or at a first voltage level at a service ceiling altitude of the aircraft; and
the second dielectric insulation is rated for a different, lower voltage level at the same range of altitudes or at a second voltage level at the service ceiling altitude of the aircraft.

4. The system as recited in claim 3, further comprising an electric energy storage module electrically connected to the DC input of the DC/DC electrical power converter via the input electrical conductor.

5. The system as recited in claim 3, further comprising an electric energy module electrically connected to the DC input of the DC/DC electrical power converter via a first electrical conductor.

6. The system as recited in claim 3, wherein the first dielectric insulation is rated for arc protection at specific voltage levels at altitudes between and including: a cruising altitude and the service ceiling altitude of the aircraft.

7. The system as recited in claim 3, further comprising a plurality of aircraft systems connected to the power bus, each via a respective aircraft system electrical conductor having a respective aircraft system dielectric insulation disposed circumferentially thereabout.

8. The system as recited in claim 7, wherein the second dielectric insulation and respective aircraft systems dielectric insulations are rated for arc protection at a lower voltage level at range of altitudes between and including: a cruising altitude and the service ceiling altitude of the aircraft.

9. The system as recited in claim 7, wherein the aircraft system electrical conductors and the output electrical conductors are rated for highest voltage at lowest pressure altitude.

10. The system as recited in claim 9, wherein the second dielectric insulation and respective aircraft systems dielectric insulations are rated for arc protection for a first operating voltage at ground level, a second operating voltage at a lowest pressure altitude, and rated for altitudes in between the lowest permitted altitude and the highest permitted altitude as a smooth function of altitude.

11. The system as recited in claim 9, wherein the second dielectric insulation and respective aircraft systems dielectric insulations are rated for arc protection for a first operating voltage at ground level, a second operating voltage at a lowest pressure altitude, and rated for altitudes in between the lowest permitted altitude and the highest permitted altitude as a step change function of altitude.

12. The system as recited in claim 1, wherein controlling the switching circuit to vary the voltage at the DC output as a function of altitude further includes decreasing the voltage at the DC output as altitude increases.

13. The system as recited in claim 1, wherein the control module is operative to automatically control switching of the switching circuit without user input.

14. A system for controlling aircraft power in an electric aircraft, comprising:
- an altitude sensor of the electric aircraft;
- a switching module connecting between a DC input and a DC output of a DC/DC electrical power converter, the DC output configured to be connected to an aircraft system via a conductor having a dielectric insulation disposed therearound, the dielectric insulation rated for an altitude less than a maximum service altitude of the aircraft; and
- a control module operatively connected to the switching module and to the altitude sensor, the control module being configured to control the switching module to set a voltage of the DC output to at most a maximum voltage value, the maximum voltage value determined as a function of the altitude determined from the altitude sensor and corresponding to a voltage value above which a risk of electrical arcing via the conductor and through the dielectric insulation is increased for the altitude.

15. The system as recited in claim 14, wherein the DC input is a first DC input and further comprising:
- an electric energy storage module electrically connected to the first DC input;
- an electric energy module electrically connected to a second DC input connected to the switching module;
- a power bus electrically connected to the DC output; and
- a plurality of aircraft systems electrically connected to the power bus.

16. The system as recited in claim 15, wherein at least one aircraft system of the plurality of aircraft systems is an electrical power system for propulsion.

17. The system as recited in claim 15, wherein the electric energy module includes a generator.

18. The system as recited in claim 15, wherein the electric energy module includes a fuel cell.

19. The system as recited in claim 15, wherein at least some of the plurality of aircraft systems are not for propulsion.

20. A method of controlling voltage in an aircraft power system of an aircraft, comprising:
- receiving from an altitude sensor input indicative of an altitude of the aircraft; and
- controlling a switching circuit of an electrical power converter of the aircraft to set a voltage of a DC output of the electrical power converter to at most a maximum voltage value, the maximum voltage value determined as a function of the altitude of the aircraft and corresponding to a voltage value above which a risk of electrical arcing via a conductor and through a dielectric insulation disposed around the conductor is increased for the altitude, the conductor connecting the electric power converter to an aircraft system.

* * * * *